United States Patent Office 3,216,931
Patented Nov. 9, 1965

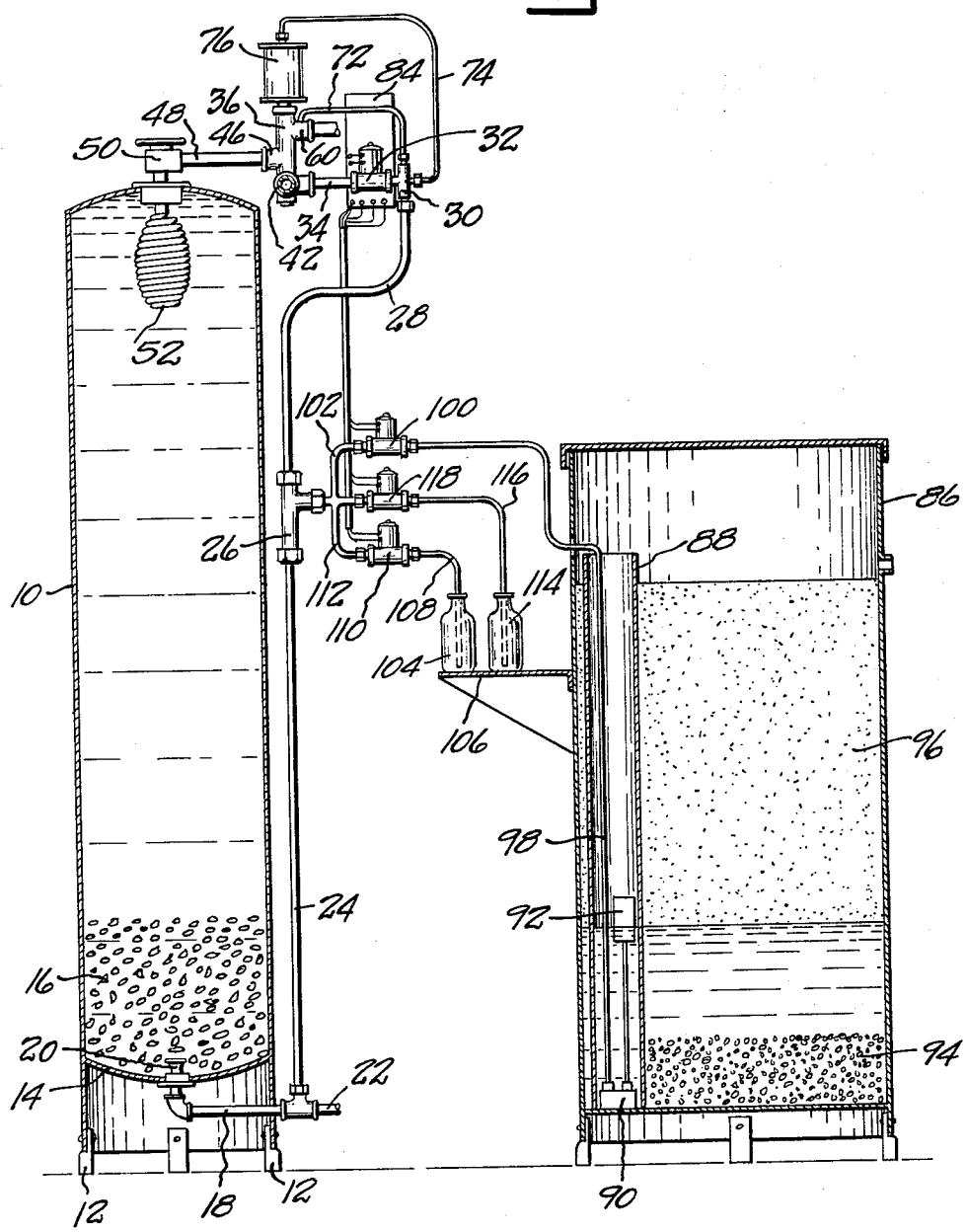

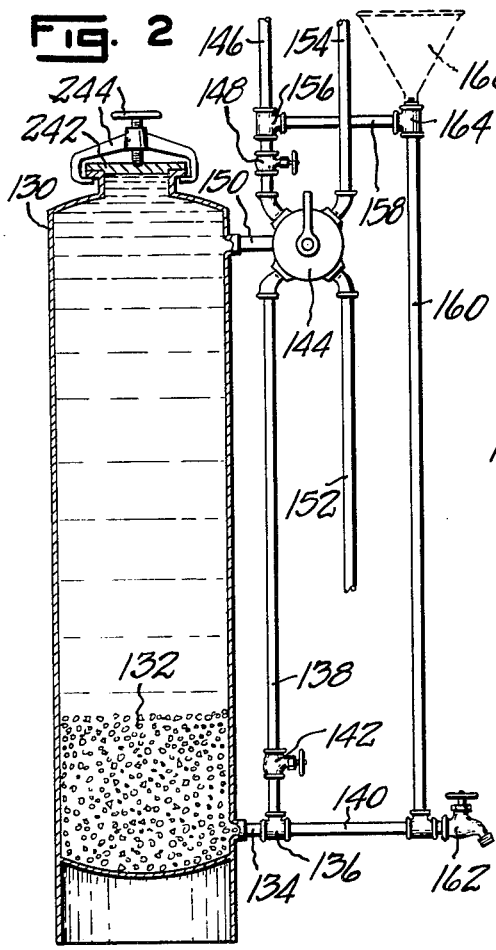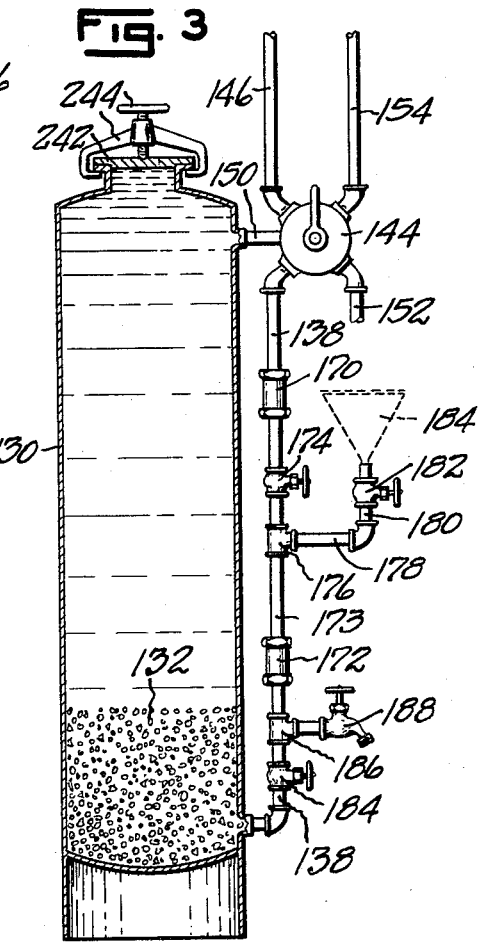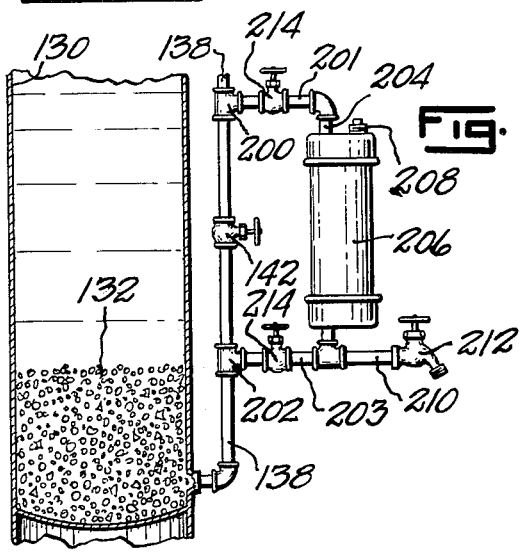

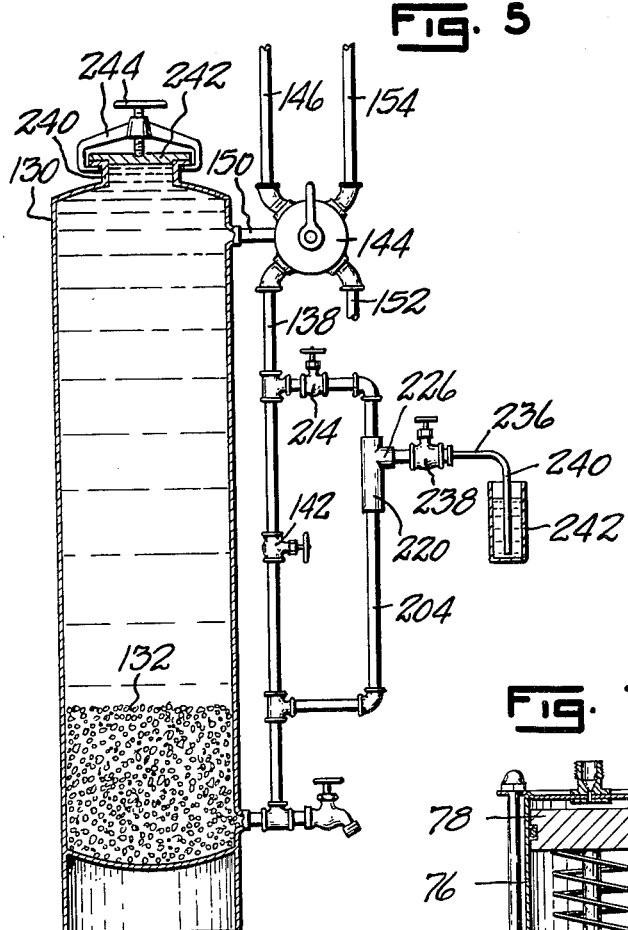
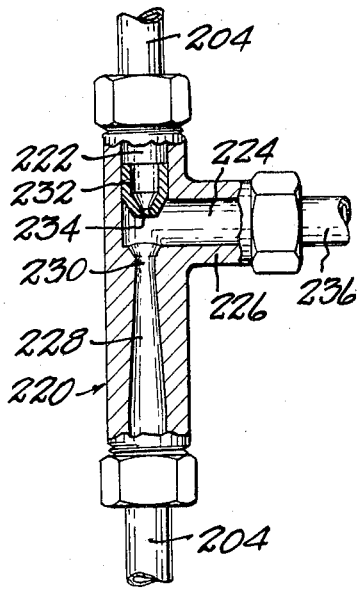
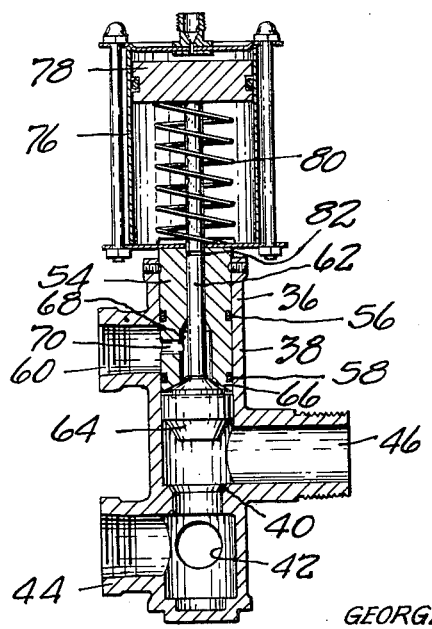

3,216,931
METHOD AND MEANS FOR CLEANING IMPURI-TIES FROM WATER TREATING AGENTS
George B. Dennis, 26530 Auten Road, and George A. Resnik, 21751 Auten Road, both of South Bend, Ind.
Filed Nov. 8, 1962, Ser. No. 237,439
1 Claim. (Cl. 210—30)

This application is a continuation-in-part of the copending application of George B. Dennis, Ser. No. 783,264 filed Dec. 29, 1958, now abandoned.

This invention relates to method and means for cleaning impurities from water-treating agents in such water-treating devices as water softeners, water filters and devices for removing iron from water.

The primary object of this invention is to provide a novel and simple method by which scale deposits and foreign matter may be removed from granular water-treating agents in water-treating devices.

A further object is to provide a method of freeing water-treating agents of foreign matter and scale deposits by successively releasing scale deposits by the use of a sequestering agent and flushing foreign matter by the use of a dispersing agent.

A further object is to provide means for selectively introducing into water-treating devices for flow through water-treating agents thereof, in convenient manner, and selectively at the will of the operator and successively, a sequestering agent and a dispersing agent.

A further object is to provide means for cleaning impurities from granular zeolite of a water softener having a conduit connected with a container of zeolite and provided with backwash control means, wherein a container of water-treating material communicates with said conduit to selectively discharge water to said water softener an aqueous solution of the water-treating agent during backwash of said water softener.

A further object is to provide a method of regenerating granular beds of zeolite in a water softener by successively forcing therethrough, in an upflow, aqueous solutions of a scale sequestering agent, a scale dispersing agent and a zeolite regenerating agent.

A further object is to provide a method of freeing water-treating agents from scale and foreign material by successively passing therethrough a dispersing agent, a biocidal agent and a sequestering agent.

Other objects will be apparent from the following specification.

In the drawing:
FIG. 1 is a view in side elevation with parts shown in section, illustrating our device applied to an automatic water softener;
FIG. 2 is a view in side elevation with parts shown in section, illustrating our device employed with a single tank water-treating device having a master control valve;
FIG. 3 is a view in side elevation with parts shown in section of a single tank water-treating device having a master control valve and illustrating a modified embodiment of our invention;
FIG. 4 is a fragmentary view in side elevation of a single tank water-treating device having a master control valve and illustrating another embodiment of our invention;
FIG. 5 is a view in side elevation of a single tank water-treating device having a master control valve and illustrating still another embodiment of the invention;
FIG. 6 is an enlarged fragmentary detail sectional view illustrating a jet used in the embodiment illustrated in FIG. 5; and
FIG. 7 is a detail sectional view of a valve used in the water softener shown in FIG. 1.

Referring to the drawings, and particularly to FIG. 1 which illustrates a water-treating device in the nature of an automatic water softener with which our invention is adapted to be used, the numeral 10 designates a container having supporting legs 12 and provided with a bottom 14 spaced above the supporting surface on which the legs 12 rest. Granular water-treating material 16, such as zeolite, is contained in the tank or container 10. A conduit 18 communicates with the interior of the container 10 at the bottom thereof by means of a distributor or fitting 20. Conduit 18 has connection with a conduit 22 constituting a soft water outlet and provided with a suitable valve (not shown). A conduit 24 branches from conduit 18 and extends upwardly thereof to an injector 26 preferably located intermediate the height of tank 10. The injector 26 is in turn connected by a conduit 28 to a fitting 30 associated with the outlet of a solenoid valve 32. The solenoid valve 32 is connected by a conduit 34 to the body of a control valve 36 which may be of a construction as illustrated in FIG. 7.

The valve 36 preferably constitutes an elongated tubular housing 38 having a valve seat 40 intermediate the length thereof. A hard water inlet 42 and a port 44 at which the conduit 34 is connected are located below the valve seat 40 as illustrated. An outlet 46 is located above the valve seat 40 and intermediate the height of the valve casing 38. Outlet 46 is connected by a conduit 48 to a fitting 50 carried by the top of the container 10 and in turn communicating with a distributor or collector coil 52 within the container 10 at the upper end thereof.

An insert 54 is located within the upper end of the valve body 38 and preferably has a pair of circumferential sealing members, such as O-rings 56 and 58, located above and below a drain port 60 in the valve body. The insert 54 has a longitudinal bore therethrough slidably receiving a rod or stem 62 mounting a valve head 64. Head 64 is adapted to seat against the end of the insert 54 at 66 around the mouth of an enlarged portion 68 of the longitudinal bore in the insert 54. A lateral passage 70 in the insert 54 communicates with longitudinal bore portion 68 and with the drain port 60. A drain line will extend from the drain port 60.

A bleeder tube or line 72 is connected to the fitting 30 and to the drain port 60. A control valve tube or line 74 is connected to the fitting 30 and extends to and communicates with the upper end of a cylinder 76. A piston 78 carried by the valve rod 62 reciprocates in the cylinder 76, and a coil spring 80 bears against the lower end of the piston 78 and the lower end of the cylinder 76. A seal, such as an O-ring or other packing 82, prevents passage of water through the piston rod receiving bore in the insert 54 and into cylinder 76.

A suitable timer or other control 84 serves as the means for controlling the solenoid valve 32.

A second tank 86 is located alongside the tank 10 and has a partition therein at 88 defining an outlet chamber, the lower portion of which is apertured to provide communication between said outlet chamber and the tank 86. A valve 90 connected with a source of water under pressure and controlled by a float 92 is located in the chamber defined by member 88 and serves to regulate the water level within the tank 86 and said chamber. A bed of granular material 94 is located within the container 86 and dry rock salt 96 is introduced into the container 86 to a level below the open upper end of the chamber-defining member 88. An outlet conduit 98 communicates with the valve 90. Valve 90 is preferably an air and brine draw valve and communicates with a solenoid valve 100 controlled by the timer or control member 84. A conduit 102 connects the valve 100 with the inlet of the injector 26.

A container 104 for a water-treating material, such as a sequestering agent, may be supported in any suitable manner adjacent to the injector 26, as upon a support or shelf 106 carried by the tank 86. The container 104 is connected by a conduit 108 with a solenoid valve 110 actuable by or controlled by the timer or control member 84, and a conduit 112 connects valve 110 with the inlet of the injector 26. A second container 114 for a water-treating material, such as a dispersing agent, is mounted upon the support 106 and is connected by a conduit 116 with a solenoid valve 118 actuated under control of the timer or control member 84. Valve 118 is interposed in the conduit 116 and said conduit is connected to the inlet of the injector 26.

In the use of the device, water will normally flow from the supply line to the valve inlet 42 and through the valve 36, the outlet 46, and the conduit 48 to the container 10. The water flowing through the container 10 passes through the bed of treating material, such as granular zeolite 16, and thence is discharged through fixture 20, conduit 18 and supply line 22.

Assuming that a liquid sequestering agent is provided in container 104 and a liquid dispersing agent is provided in container 114, and that the tank 86 contains brine, and that the parts are operatively connected together as described and illustrated, the device is ready for cleaning and regenerating. When the controller or timer 84 operates to start regenerating the zeolite 16 and cleaning the same of contained impurities, it may operate valves 36, 100, 110 and 118 in any sequence desired. Thus it may operate the solenoid valve 32 to open the same and permit water from conduit 34 communicating with the supply line 42 to pass to the distributor or fixture 30. Water flows from fixture 30 into and through the control valve tube 74, the conduit 28 leading to the injector 26, and the bleeder line 72. The pressure of water passing through control valve tube 74 acts upon the piston 78 against the action of spring 80 to force the piston down to cause the valve head 64 to engage the valve seat 40. This valve setting opens the conduit 48 communicating with the top of the container 10 into communication with the outlet 60 which leads to a drain, and it also directs water from the supply inlet 42 through the conduit 34 and fitting 30 to the conduit 28.

At the same time that the controller 84 actuates the solenoid valve 32, or in some predetermined timed relation to the operation of the solenoid valve 32, one of the solenoid valves of the group 100, 110 and 118 is energized to open the same. For example, if the container 104 contains a liquid sequestering agent, the valve 110 may be opened while the valves 100 and 118 remain closed. As water from the conduit 28 passes through the injector 26, the injector operates to draw or aspirate the sequestering agent in the container 104 into the injector to be mixed with the water flowing through the injector and thus provide an aqueous solution of the sequestering agent. This aqueous solution passes from the injector 26 through the conduits 24 and 18 and the fitting 20 into and through the granular water-treating material, such as granular zeolite 16, and thence passes up to the top of the container 10 for discharge through conduit 46, valve 38 and valve outlet 60 to drain. The timer 84 will remain in a setting to hold the solenoid valve 110 open until all of the sequestering agent within the container 104 has been entrained in water flowing through conduits 28 and 24 and has been discharged at outlet 60, and then solenoid valve 110 will be closed, while the solenoid valve 32 remains open.

At a predetermined period of time following opening and reclosing of the valve 110, the solenoid valve 118 may be opened. The opening of the valve 118 permits the contents of the container 114, such as a liquid dispersing agent, to be drawn or aspirated into the water flowing through the injector for conduit 28 to conduit 24. The aqueous solution of the dispersing agent so formed passes in an upflow through the granular water-treating material 16 and the container 10 and valve 36 for discharge to drain at 60. The valve 118 will be closed by the timer 84 after a time interval allowing discharge of the material in the container 114.

At a predetermined time after the re-closing of solenoid valve 118 the solenoid valve 100 may be opened. The opening of the solenoid valve 100 permits the injector 26 to draw or aspirate a brine or saline solution from the tank 86 and to entrain the same in water flowing through conduits 24 and 18 to container 10 for upflow through the bed 16 of water-treating material and to the outlet of the container for discharge through valve 36 to an outlet 60 leading to the drain. Water flowing through the injector may draw first brine and then air from the tank 86 in a preferred form, the air serving to aerate the water-treating bed 16. Valve 100 will remain open for a sufficient period of time to permit all of the saline solution to pass through the container 10 and also to permit the flushing or rinsing of the water-treating material 16.

When the controller 84 reaches the end of the cycle of operation, the solenoid valves 32 and 100 close. Flow of water in the valve control line 74 stops and the piston spring 80 acts with the liquid pressure against the valve head 64 to raise the piston 78 in the cylinder 76 to permit the valve head 64 to seat at 66 throwing the valve ports 42 and 46 into communication. Water flows through valve conduit 74, fitting 30 and bleed conduit 72 to the drain outlet 60 to accommodate the upward movement of the piston 78 in the cylinder 76. This reconditions the system so that water flows from the inlet 42 of the valve 36, the conduit 48, to and through the container 10 and the water-treating material 16 therein and thence out through conduit 18 and the outlet 22.

In the embodiment of the invention illustrated in FIG. 2, a vertically elongated container 130 has a bed of granular water-treating material 132 in the lower portion thereof which may be zeolite material for softening water or a material to filter water or to remove iron from water. At the lower end the container 130 is tapped by a conduit 134 with which communicates a T-fitting 136 from which branch conduits 138 and 140. Conduit 138 will extend vertically upwardly and is provided with a shutoff valve 142 therein. Conduit 138 communicates with a multiple position control valve 144. A water supply line 146 communicates with valve 144 and has a valve 148 interposed therein. A conduit 150 extends between and communicates with the upper portion of the tank 130 and the control valve 144. One or more additional lines, such as a line 152 leading to drain, may also be connected with the valve 144. If desired, a service line 154 may be connected with the valve 144.

A T-fitting 156 may be interposed in a conduit 146 and connected with a conduit 158 forming part of a by-pass around the valve 144, which by-pass also includes a conduit 160 and a conduit 140. A valve faucet or outlet 162 may be provided at the end of conduit 140. A fitting 164 communicating with the conduit portion 158 and 160 provides means for mounting a funnel 166 adapted to receive water-treating material. It will be understood that the fitting 164 may include a plug for closing the same when funnel 166 is not in use.

The valve 144 will control flow through the liquid treating system, as well understood in the art. In a down-flow unit, the valve 144 will normally be set to control the flow of water from inlet 146 to conduit 150 for entry into the container 130 and ultimate discharge therefrom through conduits 134 and 138 to the service line at 154. If upflow or backwash operation is desired, the valve 144 may be set to permit flow from inlet 146 to and through conduits 138 and 134 through the granular bed 132 in an upflow for discharge through conduits 130 and 154.

When it is desired to clean the granular bed 132, the funnel 166 is connected to the fitting 164 and valves 148 and 142 are closed. A sequestering agent may be introduced into the funnel 166 and the valve 144 is so set as to control flow from supply line 146 through by-pass conduits 158, 160 and 140, to conduit 134 and through the bed of liquid treating material 132, thence up through the container to the conduit 150 for discharge to drain at the conduit 152. In this arrangement the sequestering agent is fed from funnel 166 and enters the water stream within the by-pass at a regulated rate determined by the discharge orifice of funnel 166 so as to provide an aqueous solution which passes through the system. After the sequestering agent empties from the funnel 166 and sufficient time has been allowed to permit the sequestering agent to pass to drain through conduit 152, the funnel 166 may be filled with a dispersing agent which passes into the by-pass at a regulated rate to form an aqueous solution capable of flushing foreign material from the granular bed 132 different from that acted upon by the sequestering agent. Operation is continued for a period of time following discharge of the dispersing agent from the funnel 166 sufficient to permit the foreign matter released from the granular treating material 132 to be discharged from the container 132. Thereupon the valves 142 and 148 are reopened, the funnel 166 may be removed, and the fitting 164 may be replugged. Thereupon the normal operation of the mechanism may be resumed, or a brine solution may be passed through the material 132 as well understood in the art of water softening devices.

The water treatment mechanism shown in FIG. 3 is substantially similar to that shown in FIG. 2, and similar parts bear similar reference numerals. In this construction the conduit 138 is interrupted and a pair of spaced couplings 170 and 172 connect a conduit 173 in conduit 138. Conduit 173 may have a valve 174 and a T-fitting 176 therein. T-fitting 176 provides connection for conduit 178 having an upturned end portion 180 having interposed therein a valve 182. A funnel 184 may be mounted at the upper end of the conduit 180. Also, if desired, a valve 184 and a fitting 186 may be connected in the conduit 138 below the lower coupling 172 and a valve faucet or outlet 188 may be connected with the fitting 186. The use of couplings 170 and 172 to connect conduit 173 in conduit 138 permits rapid adaptation of a conventional single-tank water softener to a device for using our method, by simply cutting away a section of conduit 138.

In normal operation, the valve 182 will be closed and valves 174 and 184 will be open so that water may flow from supply line 146 to and through the body of granular water-treating material 132 to the supply line 154 in any flow path determined by the setting of valve 144. When cleaning of the granular material 132 is to start, valve 182 is opened, and valve 144 is set so that flow occurs from supply line 146 through valve 144 and conduits 138 and 173 to and through container 130 and thence through conduit 150 and the valve 144 to the drain line 152. The water-cleaning agents, such as a sequestering agent and a dispersing agent as described above, are successively supplied to the funnel 184, and each is permitted to drain from the funnel 184 through the line 180, 178 to be entrained in the water passing through line 138, 173 and thus form an aqueous solution of a treating material to act upon the granular bed of material 132.

In the construction shown in FIG. 4, parts similar to those shown in FIG. 2 bear the same reference numerals. In this arrangement the conduit 138 has valve 142 mounted therein intermediate its ends and between a pair of fittings or T's 200 and 202, from which project branch conduits 201 and 203, respectively, which form part of a by-pass including conduit portion 204 and a container 206 provided with a top opening adapted to be closed by a seal 208, such as a cap or plug. A drain conduit 210 communicates with the bottom of container 206 and may be provided with a valve faucet 212 or other suitable releasable seal. Each of the branch conduits 201 and 203 has mounted therein a control valve 214. It will be understood that container 206 may be connected in conduit 138 between couplings 170, shown in FIG. 3, and between valves 214, if desired, or it may be connected in a water supply line 146 when used with water-treating means having a control permitting a backwash operational setting.

In the normal operation of this device, water is permitted to flow through the bed of water-treating material 132 in either an upflow or downflow in a circuit including the conduit 138 as determined by the setting of valve 144. When cleaning of the material 132 is desired, the control valve 144 will be set so that water will pass through the conduit 138 in a downward direction. Valves 214 will then be opened, and valve 142 will be closed so that water passes through the by-pass including the container 206 to enter the lower end of the container 130 and pass upwardly through the treating material 132. The container 206 is succesively filled with a sequestering agent and a dispersing agent and is sealed after each filling, so that said agents are mixed with water flowing through the container and are passed in aqueous solution through the bed of granular material 132 and discharged at a drain. The treating device may then be provided with a salt solution and rinsed, if a water softener, and then reconditioned for normal water-treating operation by proper manipulation of valves 214, 142 and 144.

In the embodiment of the invention illustrated in FIG. 5, parts similar to those shown in FIGS. 2 and 4 bear the same reference numerals. In this construction an injector 220 is interposed in the by-pass conduit 204. The injector is preferably of the character illustrated in FIG. 6 and comprises an elongated tubular body having a large inlet passage 222 extending longitudinally thereof at its upper end and communicating with a transverse passage 224 in a branch 226 intermediate its ends. A lower passage 228 communicates with the upper passage 222 at a restricted orifice 230. A jet nozzle 232 is mounted in the upper passage 220 with its tip having a restricted orifice 234 projecting into a junction between the passages 222 and 224 and aligned with the restricted orifice 230. Conduit 236 communicates with branch 226 and has a valve 238 interposed therein. The end portion 240 of the conduit 236 is downturned and is adapted to be immersed in a container 242. It will be understood that the injector 26 of FIG. 1 may be of the construction shown in FIG. 6.

In the use of this embodiment of the invention to clean the granular water-treating material 132, the master valve 144 is set to direct water from supply line 146 to conduit 138. Valve 142 in line 138 is closed and valve 214 in the by-pass is opened. The container 242 is filled with the desired quantity of a sequestering agent or a dispersing agent and the valve 238 is opened. Thus as water flows through the injector 220 the agent within the container 242 is aspirated into the by-pass conduit 204 and is then passed to the container 130 for flow in an upward direction through the granular treating material 132. The valve 144 will be so set that water discharging in conduit 150 at the upper end of the container 130 is discharged to drain at conduit 152. After the first agent has been exhausted and has been flushed to drain, a second agent may be introduced in container 242 and aspirated into the water flowing in the by-pass 204 to be pumped through the granular treating material 132 and discharged to drain at 152. When these operations have been completed, valves 214 and 238 may be closed, valve 142 may be opened, and valve 144 reset so as to provide the desired flow for normal operation of the water-treating device of a subsequent conditioning or softening operation upon the device.

In the event the devices shown in FIGS. 2, 3, 4 and 5 constitute water softeners using zeolite as the water-treating material 132, they may be regenerated by introducing salt or a saline solution through opening 240 in the upper end of container 130 which is normally sealed by closure 242 held in place by locking means 244.

Water treatment devices, such as water softeners, filters and iron removers, accumulate foreign materials during their operation depending upon the content of the raw water supplied thereto. Some of this foreign material commonly takes the nature of a scale deposit on the grains of water-treating material, such as zeolite, or on filtering material, and other foreign material simply settles in and around the granular material. Scale deposits usually are of a character which cannot be flushed from the granular water-treating material by flow of water therethrough and which cannot be released therefrom by the action of salt or brine as commonly utilized in water softeners for regenerating purposes. Such scale deposits may include iron, calcium and magnesium compounds, aluminum oxides and micro-biological growths. Material which settles in and around the granular material may include silt and clay. The accumulation of such foreign material on and around the water-treating granules reduces the efficiency of the water-treating material for its intended purpose.

There are many materials which can be used to release scales of foreign matter from the water-treating granules, and to release settled foreign material. Such materials commonly fall in the categories of sequestering agents which can release scales and dispersing agents which release settlings of foreign material. Many materials are known in the art as sequestering agents, and include organic materials such as certain polyphosphates, and particularly sodium and potassium phosphates and polyphosphates, tetrasodiumpyrophosphate, tripolyphosphate, tetraphosphate, hexametaphosphate, septaphosphate and amorphousphosphate glasses with a $Na_2O_5$ ratio in the range from 1 to 1 to 1 to 1.7. Other sequestering agents include the citrates, tartarates and gluconates, such as EDTA, citric acid and gluconic acid. A common example of an efficient organic sequestering agent is ethylene diamine tetra acetate. Likewise, many materials are known in the art as dispersing agents and include polyphosphates, sulphonates and polyhydric alcohols. Suitable polyphosphates include sodium hexameta phosphate, sodium tetraphosphate, sodium tripolyphosphate and phosphates in which sodium is replaced by potassium. An example of an efficient sulphonate type of dispersing agent is alkyl aryl sulphonate, and particularly those wherein the alkyl groups are aliphatic hydrocarbon chains of 8 to 16 carbon atoms and wherein the aryl groups are benzene-naphthalene rings. Specific examples of the latter are known as "Macconal," "Santomerse," "Kreelon" and "Ultrawet." Specific examples of polyhydric alcohols usable as dispersing agents include tallow alcohol ethyleneoxide condensation products, alkylpolyethyleneoxyethanol, polyoxyethylated vegetable oil, polyoxyethylated fatty alcohol, iso-octylethenoxypolyethyleneoxyethanol, nonylethoxypolyethyleneoxyethanol, nonylphenoxypolyetheneoxyethanol, alkylethoxypolyethyleneoxyethanol and polyethylene glycol condensation products, polypropylene ethylene glycol condensation products and polyethyleneoxyalkyl-aryl alcohol.

Each of the types of apparatus described above permit the practice of a method of cleaning granular zeolite in a water softener substantially as follows. From one pint to one quart or more of sequestering agent, such as ethylene diamine tetracetate, is mixed or entrained in a stream of water to form an aqueous solution of said sequestering agent acting upon the granular body of water-treating material, such as zeolite, for several minutes when directed therethrough by upflow during backwash so as to release foreign material from the granular body. The supply of water by upflow is continued for a period of time sufficient to substantially completely rid said water-treating material and its container of said sequestering material. Then from one pint to one quart or more of a dispersing agent, such as alkyl aryl sulphonate, is mixed or entrained in a stream of water which is then forced through said granular treating material in upflow direction during continued backwashing to enable said solution of said dispersing agent to entrain therein the settled foreign material within said granular water-treating material. The flow of water is then continued for a sufficient period of time to flush from said container said aqueous solution of dispersing agent and entrained foreign material. It will be understood that the order in which the sequestering agent and dispersing agent are used is optional and may be reversed from that described, if desired.

The quantity of each of the sequestering agent and the dispersing agent which is used will depend upon various factors including the amount of foreign material carried by the granular water-treating material, the quantity of the granular water-treating material in the water-treating apparatus, and the efficiency of the sequestering agent and dispersing agent for their respective intended purposes.

Passage of the aqueous solution of the sequestering agent and the dispersing agent in upflow direction through the water-treating granular bed is preferred in order to insure maximum efficiency and rapidity of the respective sequestering and dispersing operations, to reduce the quantity of each of the sequestering and dispersing agents which is utilized, and to insure substantial uniformity of the action of the respective agents throughout the bed of water-treating material. It will be understood, however, that flow of these agents in a downflow direction is possible but at greater cost and with less assurance of efficiency.

As mentioned above, various types of deposits upon zeolite material have been found in water softeners. Thus analyses have determined that three general types of deposits in such apparatus cause loss of capacity of the zeolite bed to soften water. Ordinary brine regeneration does not usually release or dispose of such deposits. Some of the deposits are loose and include materials such as silt clay, some forms of iron oxide and other mineral oxides. A second type of deposit is tightly bonded to the zeolite and is similar to mineral scale on the zeolite media. The third type of deposit consists primarily of micro organisms, such as bacteria algae and slimes.

In cases where all three types of deposits exist, a two-step treatment as described above, using sequestering agents and dispersing agents, may be inadequate to do more than remove the loose deposits and some of the tightly bonded deposits. We have found that by using a three-step cleaning process, the exchange capacity of the zeolite and hence the softener capacity and the softener efficiency can be increased materially. Such a three-step method entails preferably the addition of a dispersing agent in the backwash water supplied to the zeolite bed during regeneration. Inorganic dispersing agents, such as polyphosphates as above described, or organic dispersing agents, such as a sulphonated alcohol having a 12 to 18 carbon chain, are effective. Other dispersing agents found suitable include alkyl aryl sulfonates and high molecular weight poly glycols. The second step of our three-step method is to add a biocidal agent to the backwash water during regeneration. Effective biocidal agents are sodium hypochloride or calcium hypochloride. We have found that if biocidal agent is added during the first step, or before the first step, the active ingredients are dissipated and cleaning is not as effective as that which is secured when adding the biocidal agent after the dispersing agent has been permitted to function. This improvement has been demonstrated on exchange beds operated in glass tubes under laboratory conditions and has been confirmed by both capacity tests and visual observation.

A third step of our three-step method is to add a sequestering agent to the backwash water. Any sequestering agent of the type abovementioned may be used. This step effectively removes the bonded type of deposit noted above. Addition of a sequestering agent as the last step avoids dissipation thereof by loosely adhering deposits which would exist had they not been removed previously by the dispersing agent.

We have found that there have been cases where micro organic growths have provided a physical barrier to the cleaning agents used in the third step where the various agents were combined or used together. Thus separation of the cleaning agents and the addition in three separate steps of the three types of agents mentioned above to the backwash water in the order mentioned above has provided a most effective cleaning of the zeolite bed.

This same cleaning process is effective for ion exchange systems, iron removal systems and filters.

One specific example of practice of the three-step method for use in connection with the regeneration of the zeolite bed of a water softener is as follows. A mixture consisting of one-half pound dodecylbenzenesulfonate and one-half pound sodium tripolyphosphate was dissolved in water and fed into the back wash line of a ten cubic foot zeolite softener for the first fifteen minutes of backwash time. Backwashing was then continued until the water ran clear. One pound of calcium hypochlorite was then added in the backwash line in the same manner. More foreign material was evident in the backwash water being discharged and backwash was continued until the backwash water was clear. Two pounds of sodium septaphosphate was then added to the backwash water in the same manner. Again foreign material and discoloration was found in the backwash stream. Backwashing was continued until the stream was clean.

In some cases after normal softener regeneration including backwashing and brine addition and rinsing, it was found that the deposits remaining in the zeolite material were such that repeated practice of the three-step method was required in order to completely remove the foreign materials. In one instance total backwash time of six hours was required to remove foreign material cleaned from the bed by the above three-step process. It will be understood that following the aforementioned cleaning process, the unit should be brined in the usual manner.

Tests to determine total exchange capacity have been made on water softeners in field use, both before cleaning by the three-step process described above and after cleaning by such three-step process. In one instance the total exchange capacity was found to be 16,000 grains per cubic foot before cleaning by our three-step process, but was increased to 30,000 grains per cubic foot after cleaning by our three-step process. This additional capacity was found to occur after only one application of the three-step process.

This method is particularly suited for use in conditioning domestic water-treating apparatus for maximum efficiency, but it can also be used on institutional, industrial and municipal apparatus. Both the method and the apparatus contemplate cleaning of water-treating equipment at minimum expense, considered both with respect to initial cost of the equipment for practicing the method and the cost of the chemicals required for use during such treatment. Likewise, the method can be practiced by unskilled and untrained persons with minimum instruction and with minimum manual exertion. Furthermore, the apparatus for practicing the method is of such a simple and inexpensive character that conventional water-treating equipment, such as water softeners, can be converted to accommodate the practice of the present method at low cost and in a short period of time. This can be accomplished as shown in the drawings, with provision for three containers for the treating chemicals of the three-step method to be injected in desired sequence and at desired times, in place of the provision of only the two containers 104 and 114 shown in FIG. 1. Addition of another container will be obvious from the foregoing description of FIG. 1.

Finally, the practice of the method will restore to high efficiency water-treating apparatus heretofore considered to require replacement because of low efficiency of operation resulting from the accumulation of foreign matter upon the water-treating granular material thereof. Hence water softeners and like apparatus may give satisfactory service over long periods of time without requiring replacement and at a high degree of efficiency compared to the common reduced rate of efficiency frequently encountered due to progressive accumulation of foreign material in apparatus not provided with cleaning equipment for removal of such foreign material.

While the preferred embodiments of the invention have been illustrated and described, it will be understood that changes in the construction may be made within the scope of the appended claim without departing from the spirit of the invention.

We claim:

The method of cleaning a bed of granular material in a water-treating device, consisting of the steps of forcing through said bed in an upflow and discharging to drain in sequence and individually an aqueous solution of a dispersing agent, then an aqueous solution of a member of the group consisting of sodium and calcium hypochlorite, and then an aqueous solution of material different from said dispersing agent and constituting a sequestering agent of the class consisting of polyphosphates, citrates, tartarates and gluconates, wherein said dispersing agent is of the class consisting of polyphosphates alkyl aryl sulphonates, tallow alcohol ethyleneoxide condensation products, alkylpolyethyleneoxyethanol, polyoxyethylated vegetable oil, polyoxyethylated fat alcohol, iso-octylethene-oxypolyethyleneoxyethanol, nonylethoxypolyethyleneoxyethanol, nonylphenoxypolyetheneoxyethanol, alkylethoxypolyethyleneoxyethanol, polyethylene glycol condensation products, polypropylene ethylene glycol condensation products and polyethyleneoxyalkyl-aryl alcohol.

References Cited by the Examiner

UNITED STATES PATENTS

| | | | |
|---|---|---|---|
| 1,883,805 | 10/32 | Martin et al. | 210—206 |
| 2,351,160 | 6/44 | Stone | 210—30 X |
| 2,539,748 | 1/51 | Mueller | 210—103 |
| 2,769,787 | 11/56 | Diamond | 210—32 X |
| 3,078,224 | 2/63 | Schultze et al. | 210—38 X |

OTHER REFERENCES

"Article": Phosphates in Water Conditioning, Industrial and Engineering Chemistry, vol. 34, No. 1 by Schwartz and Munter, pp. 32–34.

Schwartz et al.: Surface Active Agents and Detergents, vol. II, Copyright 1958 by Interscience Publishers, Inc., pp. 288–301, relied upon.

MORRIS O. WOLK, *Primary Examiner.*